Patented Jan. 4, 1938

2,104,358

UNITED STATES PATENT OFFICE 2,104,358

PRODUCTION OF SOLUTIONS OF RUBBER AND SUBSTANCES SIMILAR TO RUBBER

Jules Treboux, Basel, Switzerland, assignor to firm J. R. Geigy A. G., Basel, Switzerland No Drawing. Application June 15, 1935, Serial No. 26,865. In Germany June 29, 1934

7 Claims. (Cl. 134—17)

Solutions of rubber having a low viscosity and a commercially useful concentration have hitherto been made either by preparing the rubber for dissolution by mastication or by subjecting rubber, which has not been pretreated, to the action of chemical agents before or during the process of dissolution. In the latter case there have been proposed as chemical agents, oxidizing agents, such as atmospheric oxygen, organic peroxides such as benzoyl peroxide, or other substances such as saponification products of phosphorus oxy-chloride or organic or inorganic acid chlorides. The hitherto known processes, however, are not free from objection; some require a treatment of long duration, others a high temperature and others large quantities of additional substances and so on.

The present invention provides a process whereby crude rubber (non-masticated rubber) or substances resembling rubber, such as gutta-percha, balata and the like, can be dissolved in the usual solvents in a more advantageous manner than hitherto, while obtaining a lowered viscosity of such solutions. The process consists in adding before, during or after dissolution a sulphinic acid. In this manner it is possible to produce, in a short time, at a moderate temperature and with a small proportion of additional substance, for example 0.1-3.5 per cent of the weight of the rubber, light to colorless solutions having a concentration and viscosity such as could not hitherto be attained under such conditions of reaction. The degree of viscosity of the solution is directly dependent on the proportion of added sulphinic acid, so that one has at one's command a convenient means of adjusting the viscosity as may be desired. Since the process consumes only small quantities of sulphinic acid it offers the further important advantage that the final products are only very slightly contaminated by the additional substances.

The advance gained by the invention may be illustrated by the following:—

A solution of 2 per cent strength of rubber in carbon tetrachloride has, at ordinary temperature, a viscosity of 8640 centipoise (hereinafter centipoise is denoted by the symbol cp.). If, to this solution, there is added a quantity of toluene sulphinic acid of 75 per cent strength amounting to 3.5 per cent (here and in the remainder of the specification always calculated on the weight of the rubber), the viscosity is reduced to about $\frac{1}{2000}$ of its original value, that is to say to 4.5 cp.

A solution of double the strength (4 per cent) in the same solvent can no longer be poured; its viscosity exceeds 100,000 cp. If there is added 3.3 per cent of toluene-sulphinic acid of 75 per cent strength the thick mass passes into the form of a liquid whose viscosity amounts to 26.5 cp.

If the content of the solution in rubber is increased there can be obtained, with the aid of sulphinic acids, solutions having a concentration which could not hitherto be attained in carbon tetrachloride even by means of the known processes based on the use of the chemical reagents. For instance a solution of rubber of 9.1 per cent strength in this solvent with the addition of 4-5 per cent of toluene sulphinic acid has a viscosity of 1000 cp. However, this does not represent the upper limit which can be reached.

In other solvents it is possible to produce easily solutions of higher concentration and lower viscosity. This is illustrated by the following:—

Composition: 6.25 per cent of rubber with the addition of a quantity of toluene sulphinic acid of 75 per cent strength corresponding with 1.5 per cent of the 100 per cent material.

| Solvent | Viscosity in cp. |
| --- | --- |
| Carbon tetrachloride | 390 |
| Ortho-dichlorobenzene | 59 |
| Chlorobenzene | 14 |
| Xylene | 12.6 |
| Toluene | 9 |
| Benzene | 7.7 |

For the purpose of comparison it may be stated that a solution of 5 per cent strength of rubber in benzene without any addition has a viscosity of 16,600 cp.

Instead of para-toluene-sulphinic acid there may be used other aliphatic and aromatic sulphinic acids singly or in admixture, for example ethane-, benzene-, xylene-, cymol-, nitrobenzene- or nitrochlorobenzene-sulphinic acid and others. In selecting the sulphinic acid to be used regard should be had to its solubility in the solvent or solvent mixture to be used in each particular case.

The following examples illustrate the invention, the parts being by weight:—

Example 1

10 parts of crepe rubber and 0.35 part of para-toluene-sulphinic acid of 75 per cent strength are stirred with 150 parts of carbon tetrachloride for 3 hours at about 50° C. There is produced a solution whose absolute viscosity amounts to 80 cp. as determined in a Höppler viscosimeter at 20° C.

If in a like manner 20 parts, for example, of crepe rubber are treated with 0.6 part of para-toluene-sulphinic acid of 75 per cent strength in 150 parts of carbon tetrachloride there can be obtained directly solutions containing more than 10 per cent of rubber.

There may be added, however, a smaller proportion of the sulphinic acid; for example, a solution of viscosity 250 cp. is obtained by stirring together 10 parts of crepe rubber, 0.05 part of para-toluene-sulphinic acid of 75 per cent strength and 150 parts of chlorobenzene at 80° C.

In all cases the rubber may be stirred into the solvent together with the sulphinic acid, or it may be introduced into a solution or suspension of the sulphinic acid in the solvent.

*Example 2*

10 parts of crepe rubber and 150 parts of carbon tetrachloride are stirred together for 1 hour at about 50° C. 0.35 part of para-toluene-sulphinic acid is then added and the whole is stirred for further 2 hours, during which time the highly viscous mass becomes converted into a thinly fluid solution whose viscosity amounts to 79 cp.

*Example 3*

10 parts of crepe rubber are treated in the manner described in Example 1 with 0.35 part of benzene sulphinic acid of 70 per cent strength in 150 parts of carbon tetrachloride at about 50° C. The viscosity of the solution so obtained amounts to 110 cp.

By the procedure described in Example 1 it is also possible to produce solutions of reduced viscosity of balata in benzene, carbon tetrachloride and the like by the addition of a sulphinic acid.

The process is particularly well suited for the production of conversion products of rubber, that is solutions of rubber which are to be subjected to a subsequent treatment for converting the rubber.

What I claim is:—

1. A process for the production of solutions of rubber and substances similar to rubber, such as gutta-percha, balata and the like by causing crude rubber or similar substance to react in presence of a solvent with an acid agent, consisting in carrying out such reaction, with a small proportion of a sulphinic acid at a moderate temperature so as to realize a light to colorless solution of low viscosity.

2. A process for the production of solutions of rubber and substances similar to rubber, such as gutta-percha, balata and the like by causing crude rubber or similar substance to react in presence of a solvent with an acid agent, consisting in carrying out such reaction, during dissolution or swelling, with a small proportion of a sulphinic acid at a moderate temperature so as to realize a light to colorless solution of low viscosity.

3. A process for the production of solutions of rubber and substances similar to rubber, such as gutta-percha, balata and the like by causing crude rubber or similar substance to react in presence of a solvent with an acid agent, consisting in carrying out such reaction, after dissolution or swelling, with a small proportion of a sulphinic acid at a moderate temperature so as to realize a light to colorless solution of low viscosity.

4. A process for the production of solutions of rubber and substances similar to rubber, such as gutta-percha, balata and the like, consisting in treating crude rubber or similar substance, in presence of a solvent, with a small proportion of a sulphinic acid at about 50° C. so as to realize a light to colorless solution of low viscosity.

5. A process for the production of solutions of rubber and substances similar to rubber, such as gutta-percha, balata and the like, consisting in treating crude rubber or similar substance, in presence of a solvent, with a small proportion of a para-toluene-sulphinic acid at about 50° C. so as to realize a light to colorless solution of low viscosity.

6. A process for the production of solutions of rubber and substances similar to rubber, such as gutta-percha, balata and the like, consisting in treating crude rubber or similar substance, in presence of a solvent, with a small proportion of a benzene sulphinic acid at about 50° C. so as to realize a light to colorless solution of low viscosity.

7. A process for the production of solutions of rubber and substances similar to rubber, such as gutta-percha, balata and the like, consisting in treating crude rubber or similar substance, in presence of carbon tetra-chloride, with a small proportion of a toluene sulphinic acid at about 50° C. so as to realize a light to colorless solution of low viscosity.

JULES TREBOUX.